United States Patent [19]
Maeda

[11] Patent Number: 5,915,073
[45] Date of Patent: *Jun. 22, 1999

[54] FLEXIBILITY SETTING METHOD AND FLEXIBILITY CONTROL DEVICE FOR MULTIPLE-JOINT MANIPULATOR

[75] Inventor: Yoshiharu Maeda, Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/602,374

[22] Filed: Feb. 16, 1996

[30] Foreign Application Priority Data

Mar. 28, 1995 [JP] Japan .................................. 7-069877

[51] Int. Cl.⁶ .................................................. G06F 15/18
[52] U.S. Cl. ............................................................. 395/80
[58] Field of Search ..................... 364/167.01; 393/97.95, 393/80; 318/568.1, 568.11; 395/80

[56] References Cited

U.S. PATENT DOCUMENTS 5,502,363  3/1996  Tasch et al. ........................ 318/568.11

FOREIGN PATENT DOCUMENTS 4-343101  11/1992  Japan ............................. G05B 13/02

OTHER PUBLICATIONS

Craig, "Introduction to Robotics: Mechanics and Control," Addison–Wesley Publishing Co., Chapters 4 & 6 and pp. 129–130, Dec. 31, 1986.

Toshio Tsuji, et al., Iterative Learning of Impedance Parameters for Manipulator Control Using Neural Networks, 1992, pp. 1461–1468.

Luo Zhi–Wei, et al., On Control Design for Robot Compliant Manipulation, 1990, pp. 427–434.

F. A. Mussa–Ivaldi, et al., "Neural, Mechanical, and Geometric Factors Subserving Arm Posture in Humans", The Journal of Neuroscience, vol. 5, No. 10, pp. 2732–2743, Oct. 1985.

*Primary Examiner*—Robert W. Downs
*Assistant Examiner*—Sanjiv Shah
*Attorney, Agent, or Firm*—Staas & Halsey

[57] ABSTRACT

A method for setting the flexibility of a manipulator includes the step of extracting characteristics of the flexibility such as elasticity from a measurement result of the flexibility of a human hand. The extracted characteristics are used for determining specifications for the flexibility of the hand of the manipulator. The specifications of the flexibility of the entire hand of the manipulator are converted into specifications of the flexibility of a joint of the manipulator for setting the flexibility of the joint of the manipulator.

22 Claims, 11 Drawing Sheets

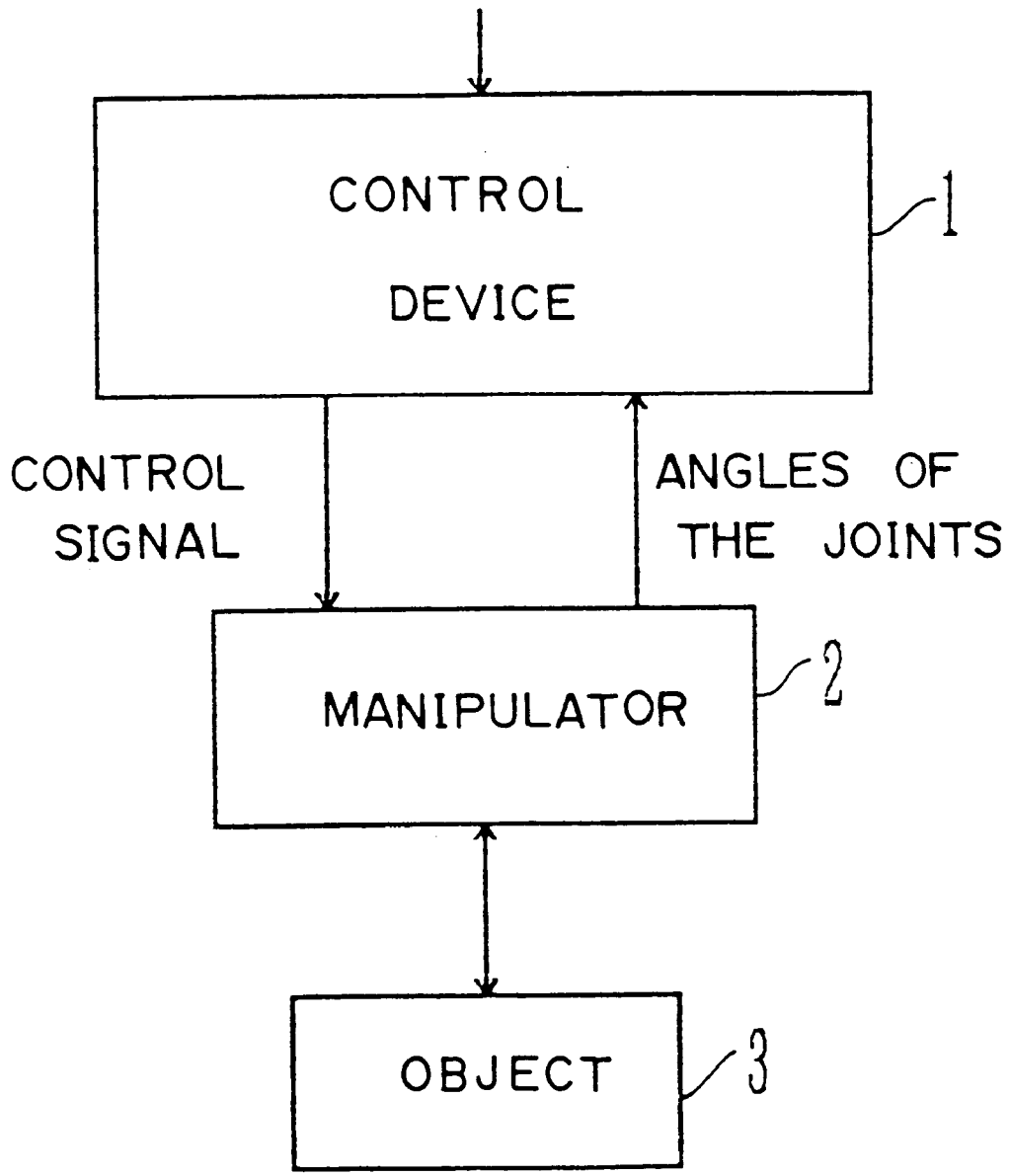
F I G. 4

FLEXIBILITY SETTING METHOD AND FLEXIBILITY CONTROL DEVICE FOR MULTIPLE-JOINT MANIPULATOR

BACKGROUND OF THE INVENTION

1. Field of the Invention

The present invention relates to a method for setting the flexibility of a manipulator according to changes in surroundings, and a device for controlling the flexibility of a manipulator.

2. Description of the Related Art

The flexibility of a manipulator or flexibility of an arm of a robot is an extremely important characteristic for a force control of the manipulator, which is an indispensable technique in manipulator operations with mechanical interactions between the manipulator and manipulating objects.

A manipulator possessing flexibility corresponding to the contents of the operations or external environments can perform difficult operations of, for example, an assembly operation of delicate parts or an operation in which the manipulator comes into contact with the human body, easily and safely compared to conventional highly rigid manipulators.

The flexibility of the manipulator means a characteristic where a manipulator changes the positions of its joints while providing a reaction against a resistance from a manipulating object, to the manipulating object, in the same way that a spring changes its length in accordance with a given force while generating a reaction.

The flexibility of a manipulator is referred to as mechanical impedance or compliance in the field of manipulator control development, and is defined by apparent inertia, viscosity, and elasticity of an effector with which the manipulator makes contact with the manipulating object.

When the manipulator performs the above operations, a dynamic interaction occurs between the manipulator and the manipulating object. Therefore, not only the position of the manipulator but also the force of the reaction must be controlled. As a typical force control method for a manipulator, the following two methods are used: a method in which the force is explicitly controlled using force feedback; and a method in which both the force and the position are controlled simultaneously by setting the flexibility or the mechanical impedance of the manipulator, which exhibits a relationship between the motion of the manipulator and the force between the manipulator and the manipulating object. The first method includes, for example, the hybrid control of the position and the force, and the second method includes, for example, the impedance control and the compliance control of the manipulator. The second method excels in adaptability to various kinds of objects and in stability for the modeling error of the manipulation object.

To date, some methods for setting the flexibility of a manipulator have been suggested in the following three references.

(1) "Compliance Setting Method" (Tetsu Matsuo and Bin Iwai, Japanese Patent application No. 03-143956, Japanese Laid-open Patent Publication No. 04-3431101), in which the requirements that the flexibility of a manipulator in a contact condition should satisfy are formularized as linear conditions, and the flexibility is solved as a question of linear programming using a proper objective function.

(2) "Iterative Learning of Impedance Parameters for Manipulator Control Using Neural Networks" (Toshio Tsuji, Masataka Nishida, and Kouji Ito, Transactions of the Society of Instrument and Control Engineers., Vol. 28, No. 12, 1461/1468, 1992.), in which the flexibility of a hand of a manipulator is described by an elastic matrix, a viscosity matrix, and an inertia matrix, using neural networks. According to this method, these matrices are set by performing a learning for desired trajectories of position and force. The target track means a track which satisfies a condition that the hand of the manipulator continues to push an object or a wall with a certain force of, for example, 1 N (newton).

(3) "On Control Design for Robot Compliant Manipulation" (Luo Zhi-wei and Masami Ito, Transactions of the Society of Instrument and Control Engineers., Vol. 26, No. 4, 427/434, 1990.), in which a reference model is designed by a model matching method in consideration of follow-up characteristics in free motion, compliance characteristics in contact performance, and adjustment characteristics for an environment.

However, the conventional methods for controlling the flexibility of manipulators have the following problems.

In conventional impedance control and compliance control, since the forces that a manipulator exerts on a object are decided by the relationship between the interaction and the motion of the manipulator indirectly, the flexibility of the manipulator must be set appropriately according to contents of the operation and characteristics of the object.

Traditionally, the flexibility of the manipulator is empirically set by individual operators. However, methods using the empirical knowledge of individual operators cannot deal with various kinds of operations and objects, and lack general versatility. The method for setting the flexibility of a manipulator is still in the development stage, and a method having high practicality is not yet available. Thus, establishment of a versatile and effective method by which appropriate flexibility is automatically set corresponding to the characteristics of the operations and the objects, is desired.

SUMMARY OF THE INVENTION

The present invention aims to provide a versatile method for setting the flexibility of a manipulator which can deal with changes of environments, and to provide a device which automatically controls the flexibility of the manipulator.

Controlling the forces exerted on a manipulating object by their hand, human can perform complicated operations, such as an operation of, for example, grasping parts of a product without destroying them and assembling the parts. The reason that the human hand can skillfully handle objects is in that the human hand has flexibility owing to the controllable viscoelasticity of its muscles, and the flexibility is appropriately adjusted according to the objects and the operations.

In a study of the force control of manipulators, the necessity that the manipulators have impedance characteristics (flexibility) has been pointed out, and the impedance control techniques for realizing the impedance control of manipulators have been developed. Recently, designing of the impedance characteristics has become an important subject for study.

If flexibility similar to that of the human hand can be realized by the manipulator, force control in the operations of the manipulator might be easily performed. In the present invention, specifications of the characteristics of the hand of the manipulator are decided in consideration of the measurement results of characteristics of the human hand, and the method for setting a joint flexibility of the manipulator for realizing these specifications is used.

A method for setting the flexibility of a manipulator according to the invention includes the steps of: extracting the characteristics effective for setting the flexibility of a hand of the manipulators from the measurement result of the flexibility of a human hand; determining a specification for the flexibility of the hand of the manipulator; transforming the specification of the flexibility of the hand of the manipulator into a specification of the flexibility of a joint of the manipulator; and setting the flexibility of the manipulator.

One of elasticity and viscosity may be used as the specification of the flexibility of the manipulator.

One of characteristics that a matrix indicating the elasticity of the hand of the manipulator is a symmetric matrix, that a major axis of an elastic ellipsoid representing the hand of the manipulator is directed toward a shoulder of the manipulator, that a ratio of the major axis to the minor axis of the elastic ellipse becomes a designated value, and that the lengths of the major axis and the minor axis of the elastic ellipsoid become specified values, may be used as the specification of the flexibility of the joint of the manipulator.

The method may further include the steps of: setting a condition for determining the elements of a first matrix indicating the elasticity of the hand of the manipulator; expressing the elements of the first matrix by elements of a second matrix indicating the elasticity of the joint of the manipulator; and determining an equation for calculating the elements of the second matrix using the condition.

Another method for controlling a manipulator according to the invention includes the steps of: extracting characteristics effective in setting the flexibility of a hand of the manipulator from the measurement result of the flexibility of a human hand; determining a specification for the flexibility of the hand of the manipulator; transforming the specification for the flexibility of the hand of the manipulator into a specification of the flexibility of a joint of the manipulator; setting the flexibility of the joint of the manipulator; and driving the manipulator according to the flexibility setting of the joint of the manipulator.

Another method according to the invention for setting the flexibility of a manipulator, which comprises a first link connected to a first joint and a second link connected to a hand of the manipulator and connected to the first link through a second joint, includes the steps of: expressing the elements of a first matrix indicating the elasticity of the hand by elements of a second matrix indicating the elasticity of a joint of the manipulator; setting conditions that the first matrix is a symmetric matrix and that a major axis of an elastic ellipsoid representing the hand is directed toward the first joint; determining an equation for calculating the elements of the second matrix using the conditions; and setting the flexibility of the manipulator according to the second matrix.

The conditions may further include a condition that a ratio of the major axis to the minor axis of the elastic ellipsoid becomes a designated value.

The conditions may further include a condition that lengths of the major axis and the minor axis of the elastic ellipsoid become specified values.

The first link may be set to have the same length as that of the second link.

Another method according to the invention for controlling a manipulator, which comprises a first link connected to a first joint and a second link connected to a hand of the manipulator and connected to the first link through a second joint, includes the steps of: expressing the elements of a first matrix indicating the elasticity of the hand by elements of a second matrix indicating the elasticity of a joint of the manipulator; setting conditions that the first matrix is a symmetric matrix and that a major axis of an elastic ellipsoid representing the hand is directed toward the first joint; determining an equation for calculating the elements of the second matrix using the conditions; setting the flexibility of the manipulator according to the second matrix; and driving the manipulator using the second matrix.

A manipulator control device used in a system for controlling the motions of a manipulator by providing control signals corresponding to the states of a joint of the manipulator to the manipulator, while monitoring movements of the joint according to the invention, comprises: an input unit for receiving a parameter which defines the flexibility of the manipulator; a processing unit for determining a value of the control signal using the parameter and the flexibility of a joint of the manipulator obtained according to the characteristic extracted from the measurement result of the flexibility of a human hand; and an output unit for outputting the control signal to the manipulator.

The input unit may receive a specific value for determining an element of one of a first matrix indicating the elasticity of a hand of the manipulator, and a second matrix indicating the elasticity of the joint of the manipulator, as the parameter, and the processing unit may determine the second matrix which indicates the flexibility of the joint of the manipulator using the specific value, and an angle of the joint of the manipulator, and determine the value of the control signal using the second matrix.

The processing unit may calculate a feedback-gain obtained according to a feedback control of the manipulator and determine a new control signal according to the feedback-gain, and the output unit may output the new control signal to the manipulator.

Another manipulator control device used in a system for controlling a manipulator, which comprises a first link connected to a first joint and a second link connected to a hand of the manipulator and connected to the first link through a second joint, while monitoring a motion of the manipulator according to the invention, comprises: an input unit for receiving an elastic parameter which prescribes the elastic characteristics of the manipulator; a processing unit for determining a value of the control signal corresponding to a state of a joint of the manipulator using the elastic parameter and the elastic characteristics of the joint obtained according to the characteristic extracted from the measurement result of the flexibility of a human hand; and an output unit for outputting the control signal to the manipulator.

The input unit may receive a specific value used for determining the elements of a first matrix indicating the elasticity of the joint as the elastic parameter; the processing unit may determine the elements of the first matrix so that a second matrix indicating the elasticity of the hand of the manipulator becomes a symmetric matrix and a major axis of an elastic ellipsoid representing the hand is directed toward the first joint, and determine the value of the control signal using the first matrix.

The processing unit may determine the first matrix using angles of the second joint.

The input unit may receive a first specific value used for determining the diagonal elements of a first matrix indicating the elasticity of the joint and a function used for deciding a ratio of the major axis to the minor axis of a elastic ellipsoid representing the hand, as the elastic parameter; the processing unit may determine the elements of the first matrix so that a second matrix indicating the elasticity of the hand becomes a symmetric matrix, and a major axis of the elastic ellipsoid is directed toward the first joint, using the first specific value and an angle of the second joint, and determine the control signal using the first matrix.

The input unit may receive a second specific value determining the ratio of the major axis to the minor axis of the elastic ellipsoid as the function.

The input unit may receive a first specific value used for deciding the diagonal elements of a first matrix indicating the elasticity of the joint, a second specific value used for determining a length of the major axis of a elastic ellipsoid representing the hand, and the third specific value used for deciding a length of the minor axis of the elastic ellipsoid, as the elasticity parameter; the processing unit may determine the first matrix so that a second matrix indicating the elasticity of the hand becomes a symmetric matrix and a major axis of the elastic ellipsoid is directed toward the first joint, using the first specific value, the second specific value, the third specific value, and an angle of the second joint, and determine the control signal using the first matrix.

BRIEF DESCRIPTION OF THE DRAWINGS

FIG. 4 shows a configuration of a control system for a manipulator according to the embodiment of the present invention;

DESCRIPTION OF THE PREFERRED EMBODIMENT

Figure 1:
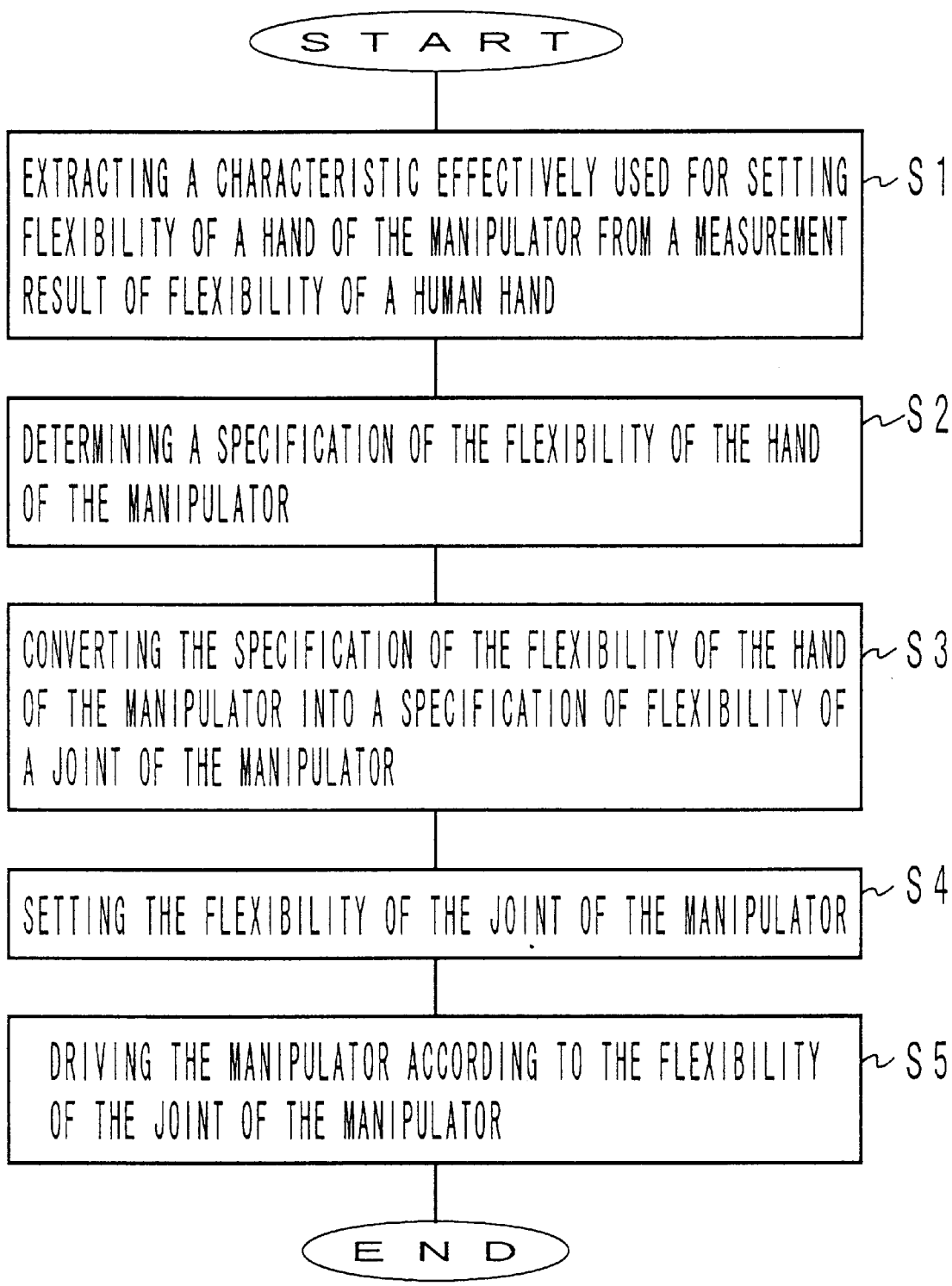
FIG. 1 shows a fundamental configuration of the present invention.

FIG. 1 shows a fundamental configuration of a method for setting the flexibility of a manipulator and controlling the manipulator according to the present invention.

In this method, a characteristic effectively used for setting the flexibility of a hand of the manipulator is extracted from a measurement result of the flexibility of a human hand or a human arm (step S1), and a specification of the flexibility of the hand of the manipulator is determined (step S2). Next, the specification of the flexibility of the hand of the manipulator is transformed into a specification of the flexibility of a joint of the manipulator (step S3), and the flexibility of the joint of the manipulator is set (step S4). Then, the manipulator is driven according to the flexibility of the joint of the manipulator set in step S4 (step S5).

In step S1, various characteristics regarding the flexibility of a human hand may be obtained from a real measurement result of flexibility which is, for example, the elasticity of a human hand. In step 2, a characteristic suitable for setting the flexibility of the hand of the manipulator may be selected from the characteristics obtained in step S1, and the specification of the flexibility of the hand of the manipulator is determined. The specification is transformed into a specification of the flexibility of a joint of the manipulator by a calculation using, for example, a elastic matrix in step S3, and an expression of the flexibility which is, for example, the elasticity of the joint of the manipulator, is set according to the specification of the flexibility of the joint in step S4. Thus, a characteristic similar to the flexibility measured from a human hand is set as the flexibility of the hand of the manipulator.

In step S5, a value of a control signal, for controlling a motion of the joint of the manipulator is determined by a calculation according to the expression of the flexibility of the joint set in step S4. Since the manipulator is controlled by the control signal so as to realize a flexibility similar to that of a human hand, the force exerted on an object is properly adjusted, thereby enabling it to perform complicated work with its hand, as people do.

Referring to the figures, an embodiment according to the invention will be described in detail. In the descriptions of the embodiment, a manipulator having two joints (a two-joint manipulator) which moves in a two-dimensional plane will be used as an example of a control object, and the elasticity of the manipulator is controlled as an example of the flexibility.

In general, a point of intersection of links which constitute a manipulator is referred to as a joint, which comprises an actuator or a motor for driving the links.

In the embodiment, a measurement result of a human hand or a human arm is obtained, and a specification for setting the elasticity of a hand of the manipulator is determined referring to the measurement result. Next, a method for setting an elasticity matrix of a joint of the manipulator is specifically formulated.

For an example of the measurement result, a measurement result of the characteristics of a human hand obtained by Mussa-Ivaldi et al. (Mussa-Ivaldi, F. A., Hogan, N., and Bizzi, E.: Neural, Mechanical, and Geometric Factors Subserving Arm Posture in Humans, The Journal of Neuroscience, 5,10, 2732/2742, 1985.) is used in this embodiment. Mussa-Ivaldi et al. gave a infinitesimal displacement to a human hand from the outside while a human arm, which comprises a upper-arm, a forearm, a hand and two joints between them, maintains a posture in a horizontal plane, and they measured the restoring force of the human hand before the human arm performed a voluntary reaction, in order to investigate the elasticity of the human hand. The following characteristics were obtained as a result of the measurement.

(1) The behavior of the human arm is spring-like, and an elasticity matrix, which shows the elasticity of the human hand, is almost symmetrical.

(2) If the elasticity of the human hand is represented by a elastic ellipsoid (or ellipse), the directions of axes of the elastic ellipsoid and the shape (ratio of the major axis to the minor axis) of the elastic ellipsoid are expressed by functions of the positions of a hand, which is regular and does not depend on individuals being tested or measurement conditions.

(3) The major axis of the elastic ellipsoid approximately points to the shoulder of a individuals being tested.

(4) The size of the elastic ellipsoid varies depending on individuals being tested and the measurement conditions.

The details of the elastic ellipsoid will be described later.

Referring to the above described measurement results of the human arm, the following specifications of the elasticity of the hand of the manipulator are set.

Specification 1: The elasticity matrix of the hand of the manipulator is a symmetric matrix.

Specification 2: A major axis of the elastic ellipsoid of the hand of the manipulator is always directed toward a first joint of the manipulator.

Specification 3: The ratio of the major axis to the minor axis of the elastic ellipsoid of the hand of the manipulator is specified as a specified value.

Specification 4: The lengths of the major axis and the minor axis of the elastic ellipsoid of the hand of the manipulator is specified as specified values.

Next, the method for setting the elasticity matrix of the joint of the manipulator is formularized so that the elasticity of the hand of the manipulator satisfies at least one of the specifications 1 through 4.

The mathematical preparations for expressing the elasticity matrix, the elastic ellipsoid, etc. will be described below.

If equation (1) holds between vector $d\hat{x}$ (referred to as "dx hat"), which indicates the displacement of the manipulator, and vector $\hat{f}$ (referred to as "f hat"), which indicates the force exerted on the manipulator, the matrix K is referred to as an elasticity matrix of the manipulator.

$$\hat{f} = K d\hat{x} \quad (1)$$

Since the relationship between the displacement dx hat and the force f hat varies depending on the elasticity matrix K according to equation (1), a desired flexibility of the manipulator can be realized if matrix K is set appropriately.

When the elasticity of the manipulator is expressed by equation (1), the elastic ellipsoid is represented by a locus of f hat shown by equation (2).

$$\hat{f} = K d\hat{x}, \quad |d\hat{x}| = 1 \quad (2)$$

Here, the direction of an eigenvector of the matrix K is coincident with the direction of an axis of the elastic ellipsoid, the direction of an eigenvector corresponding to the maximum eigenvalue, which corresponds to the direction of the major axis of the elastic ellipsoid, is the direction showing the largest elasticity (the most elastic direction of the arm), and the direction of an eigenvector corresponding to the minimum eigenvalue, which corresponds to the direction of the minor axis of the elastic ellipsoid, is the direction showing the smallest elasticity (least elastic direction of the arm). Furthermore, the ratio of the maximum eigenvalue to the minimum eigenvalue of the elastic matrix K is coincident with the ratio of the major axis to the minor axis of the elastic ellipsoid, and the size of the elastic ellipsoid is proportional to the value of the determinant of matrix K.

Figure 2:
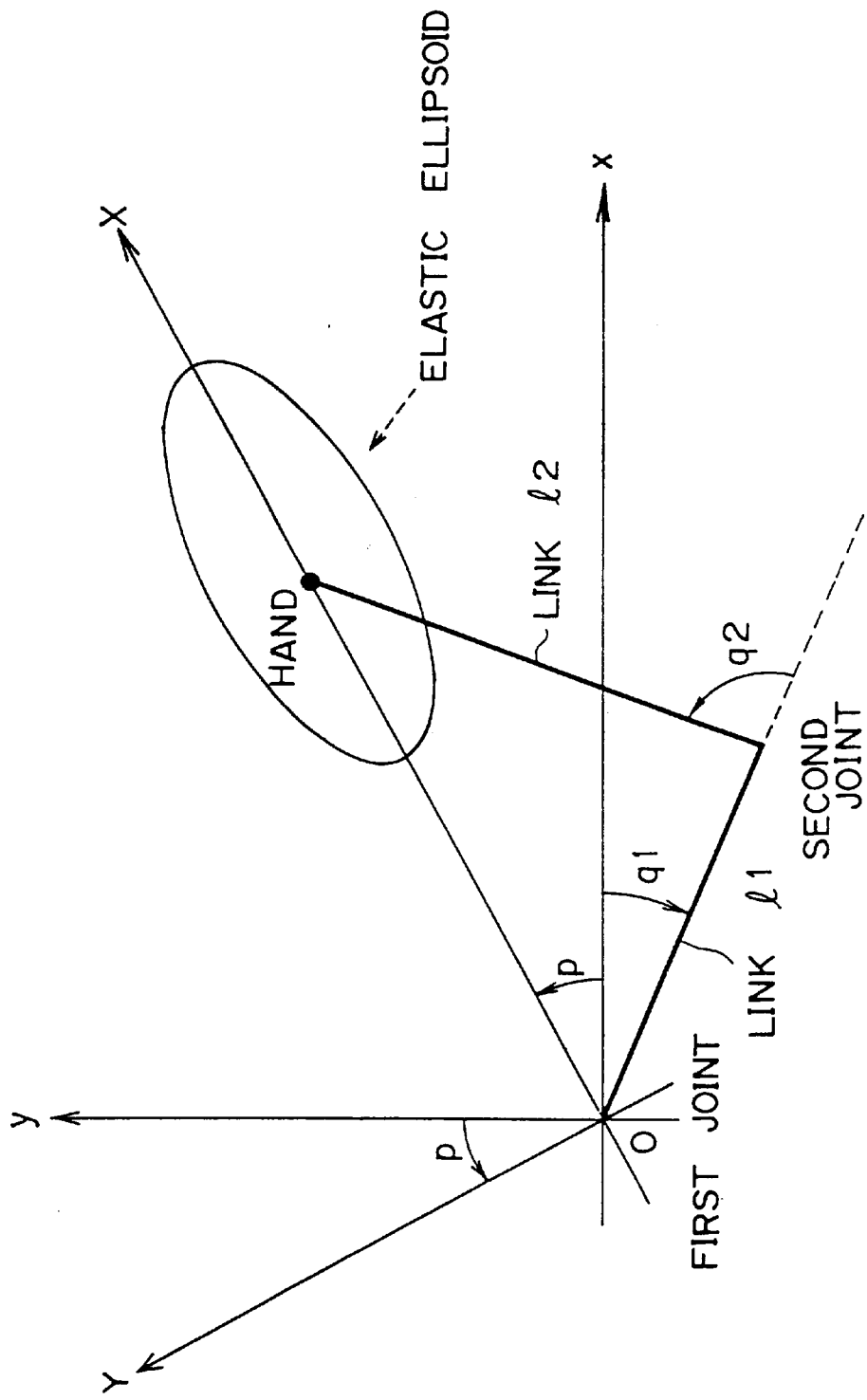
FIG. 2 shows a coordinate system and an elastic ellipse for a manipulator according to an embodiment of the present invention.

FIG. 2 shows an example of a coordinate system and an elastic ellipsoid for a manipulator according to the embodiment. In this figure, the manipulator comprises links 11 and 12 connected through a second joint, the other end of the link 11 is connected to a first joint, and the other end of the link 12 is connected to the hand.

For easy analysis, an angular coordinate of the joint ($q_1$, $q_2$), an orthogonal coordinate (x, y) the origin of which is the first joint, and an orthogonal coordinate (X, Y), which is obtained by rotating the x-y coordinate system angle p counter-clockwise, are used. The angle $q_1$ is an angle between the link 11 and the x axis, the angle $q_2$ is an angle between the link 11 and the link 12, and the angle p is an angle between the x axis and the major axis of the elastic ellipsoid of the hand. The position of the hand is located on the X axis of the X-Y coordinate system, which corresponds to a coordinate system of the hand.

Three elasticity matrices of the manipulator, each represented according to the angular coordinate of a joint ($q_1$, $q_2$), the orthogonal coordinate (x, y), and the orthogonal coordinate (X, Y), are defined as $K_j$, $K_e$, and $K_r$, respectively. The elements of the three elasticity matrices are shown in formulas (3).

$$Kj = \begin{bmatrix} k_{j11} & k_{j12} \\ k_{j21} & k_{j22} \end{bmatrix}, Ke \begin{bmatrix} k_{e11} & k_{e12} \\ k_{e21} & k_{e22} \end{bmatrix}, Kr = \begin{bmatrix} k_{r11} & k_{r12} \\ k_{r21} & k_{r22} \end{bmatrix} \quad (3)$$

Here, the relationships between the three elasticity matrices $K_j$, $K_e$, and $K_r$ are shown by equations (4) and (5).

$$K_j = J^T K_e J \quad (4)$$

$$K_r = R^T K_e R \quad (5)$$

The matrix J in equation (4) is a Jacobian matrix expressing a transformation from the angular coordinate ($q_1$, $q_2$) to the orthogonal coordinate (x, y). The matrix R in equation (5) is a rotating matrix which rotates a coordinate system angle p. The matrices $J^T$ and $R^T$ are transposed matrices J and R, respectively. Equations (4) and (5) are easily derived by using the principal of virtual work.

For the two-joint manipulator shown in FIG. 2, the coordinate of the hand (x, y)=$\hat{x}$ (referred to as x hat) is represented by equations (6) using $\hat{q}$=($q_1$, $q_2$) (referred to as q hat) and the lengths $L_1$ and $L_2$ of the respective links 11 and 12.

$$x = L_1 \cos q_1 + L_2 \cos(q_1 + q_2)$$
$$y = L_1 \sin q_1 + L_2 \sin(q_1 + q_2) \quad (6)$$

Then, equation (7) holds.

$$J(\hat{q}) = \frac{\partial \hat{x}}{\partial \hat{q}} = \begin{bmatrix} -L_1 \sin(q_1) - L_2 \sin(q_1 + q_2) & -L_2 \sin(q_1 + q_2) \\ L_1 \cos(q_1) + L_2 \cos(q_1 + q_2) & L_2 \cos(q_1 + q_2) \end{bmatrix} \quad (7)$$

Further, for the coordinate shown in FIG. 2, the matrix R is represented by equation (8).

$$R = \begin{bmatrix} \cos p & \sin p \\ -\sin p & \cos p \end{bmatrix} \quad (8)$$

When the Jacobian matrix J is reversible, the elasticity matrix $K_e$ is expressed by equation (9) using the elastic matrix $K_j$ according to equation (4).

$$K_e = J^{-T} K_j J^{-1} \quad (9)$$

Here, $J^{-T}=(J^{-1})^T=(J^T)^{-1}$, and $J^{-1}$ is an inverse matrix of matrix J.

Then, the elastic matrix $K_r$ is expressed by equation (10) using elastic matrix $K_j$ according to equation (5).

$$K_r = R^T J^{-T} K_j J^{-1} R \tag{10}$$

Using the elastic matrix $K_r$ calculated by equation (10), elastic matrix $K_j$ of the joint which satisfies the specification of the elasticity of the hand can be obtained.

Figure 3:
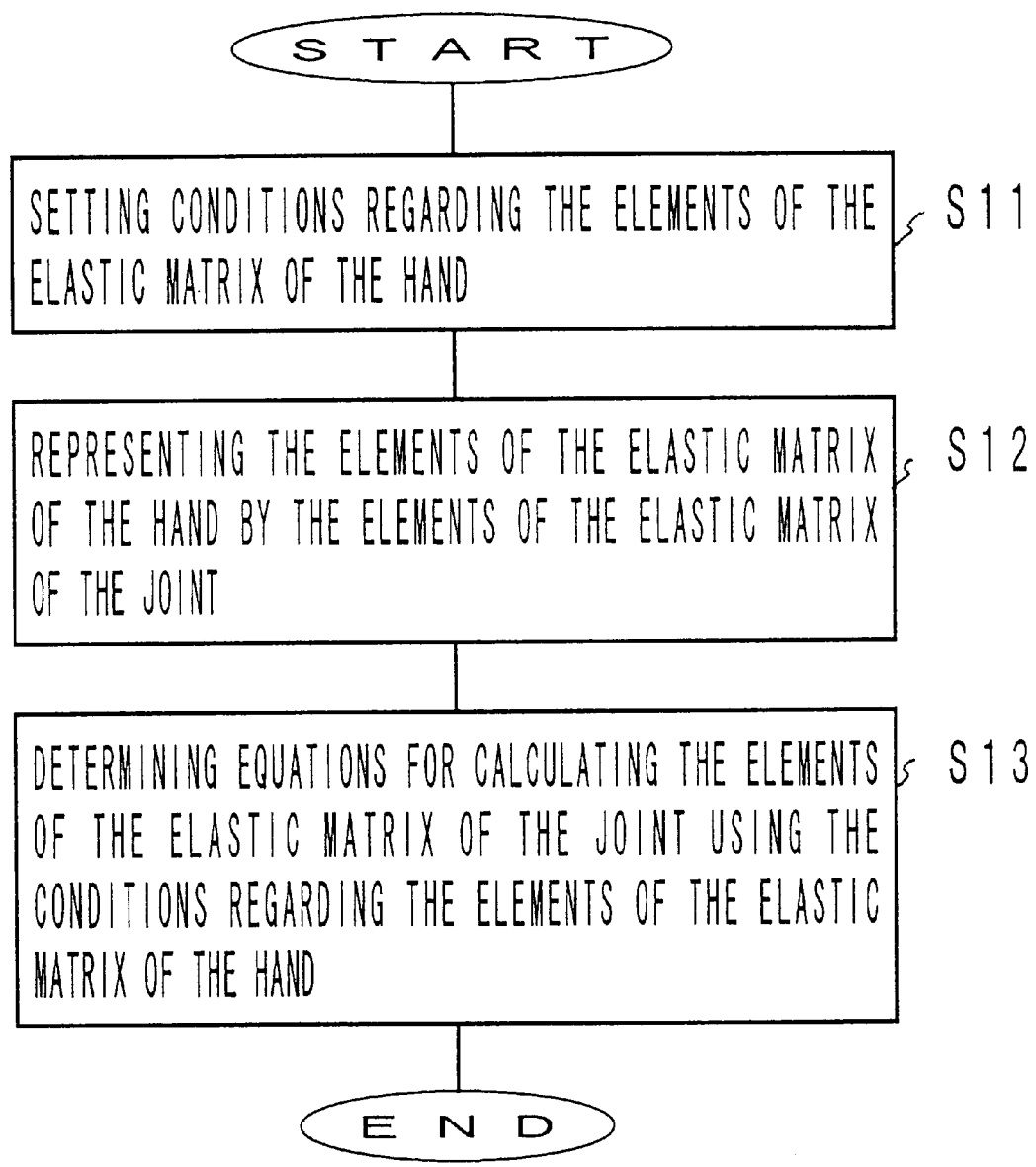
FIG. 3 is a flowchart indicating a procedure for converting elasticity according to the embodiment of the present invention.

FIG. 3 is a flowchart indicating a procedure for converting the elasticity of the hand to the elasticity of the joint, which corresponds to step S3 in FIG. 1.

In this flowchart, conditions regarding the elements of elastic matrix $K_r$ of the hand are set according to the specifications 1 through 4 (step S11). Next, the elements of elastic matrix $K_r$ of the hand are represented by the elements of elastic matrix $K_j$ of the joint according to the above described calculations (step S12). Then, equations for calculating the elements of elastic matrix $K_j$ of the joint are decided using the conditions regarding the elements of elastic matrix $K_r$ of the hand (step S13), and the converting procedure is finished.

FIG. 4 shows a construction of a control system for the manipulator of the embodiments.

The control system comprises a control device 1, the manipulator 2, and the object 3 of the manipulation. The control device 1 receives an elastic parameter used for controlling the lengths of the links and the elasticity of the manipulator 2 from, for example, an operator, and controls the motion of the manipulator 2 by monitoring the angles of the joints of the manipulator 2 and sending appropriate control signals to the actuators of the joints of the manipulator 2. The manipulator 2 works according to the received control signal and performs an operation of, for example, grasping the object 3. As the elastic parameter, the values of the elements of the matrix which correspond to the specifications of the elasticity of the hand are used.

Figure 5:
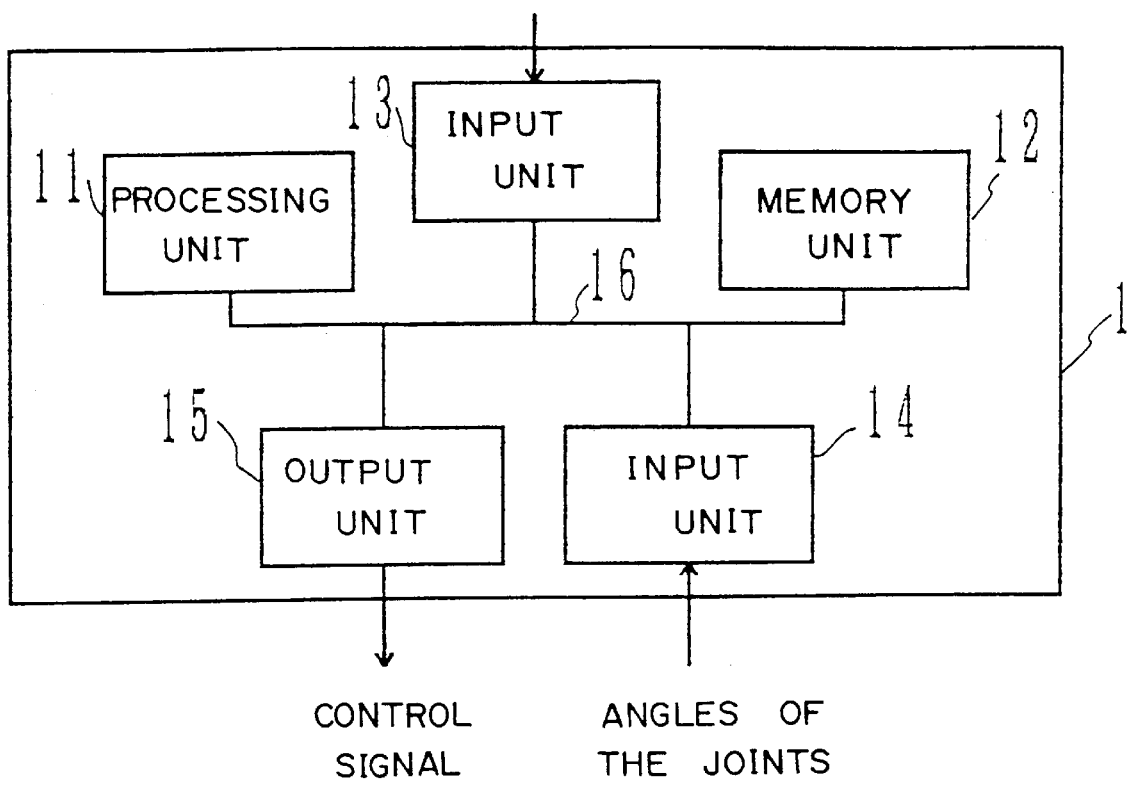
FIG. 5 shows a configuration of a control device for a manipulator according to the embodiment of the present invention.

FIG. 5 shows an example of a configuration of the control device 1 in FIG. 4. In this figure, the control device 1 comprises a processing unit 11, memory unit 12, input units 13 and 14, and output unit 15, which are connected through a bus 16 to each other. The input unit 13 receives values of the elastic parameters and the lengths of the links, which are stored in the memory unit 12. The processing unit 11 determines the proper elasticity matrix of the joint using the values of the elastic parameters and the lengths of the links stored in the memory unit 12, and the angles of the joints received from the input unit 14, and prepares the control signal using the elastic matrix of the joint. The control signal is output to the manipulator 2 through the output unit 15.

According to the invention, the elastic matrix of the joint is obtained by the procedure in FIG. 3. However, the methods for calculating the elastic matrix of the joint and the elastic parameters provided to the control device 1, vary according to which specification of the specifications 1 through 4 is used for the calculation. The first, second, and third examples of the manipulator control method according to the invention, which use different combinations of the specifications 1 through 4, will be described below.

Figure 6:
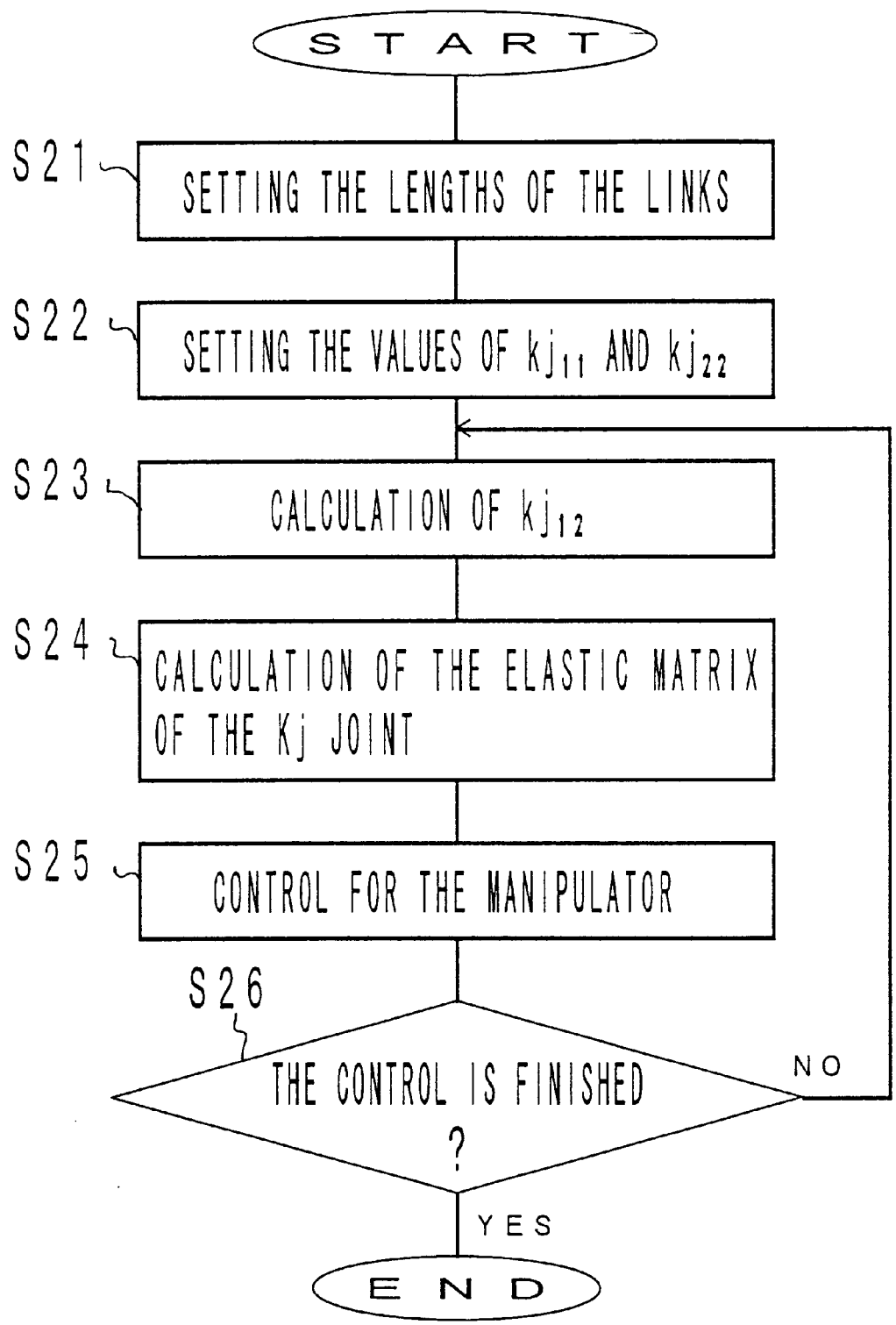
FIG. 6 is a flowchart indicating a method for a manipulator control according to a first example of the present invention.
Figure 7:
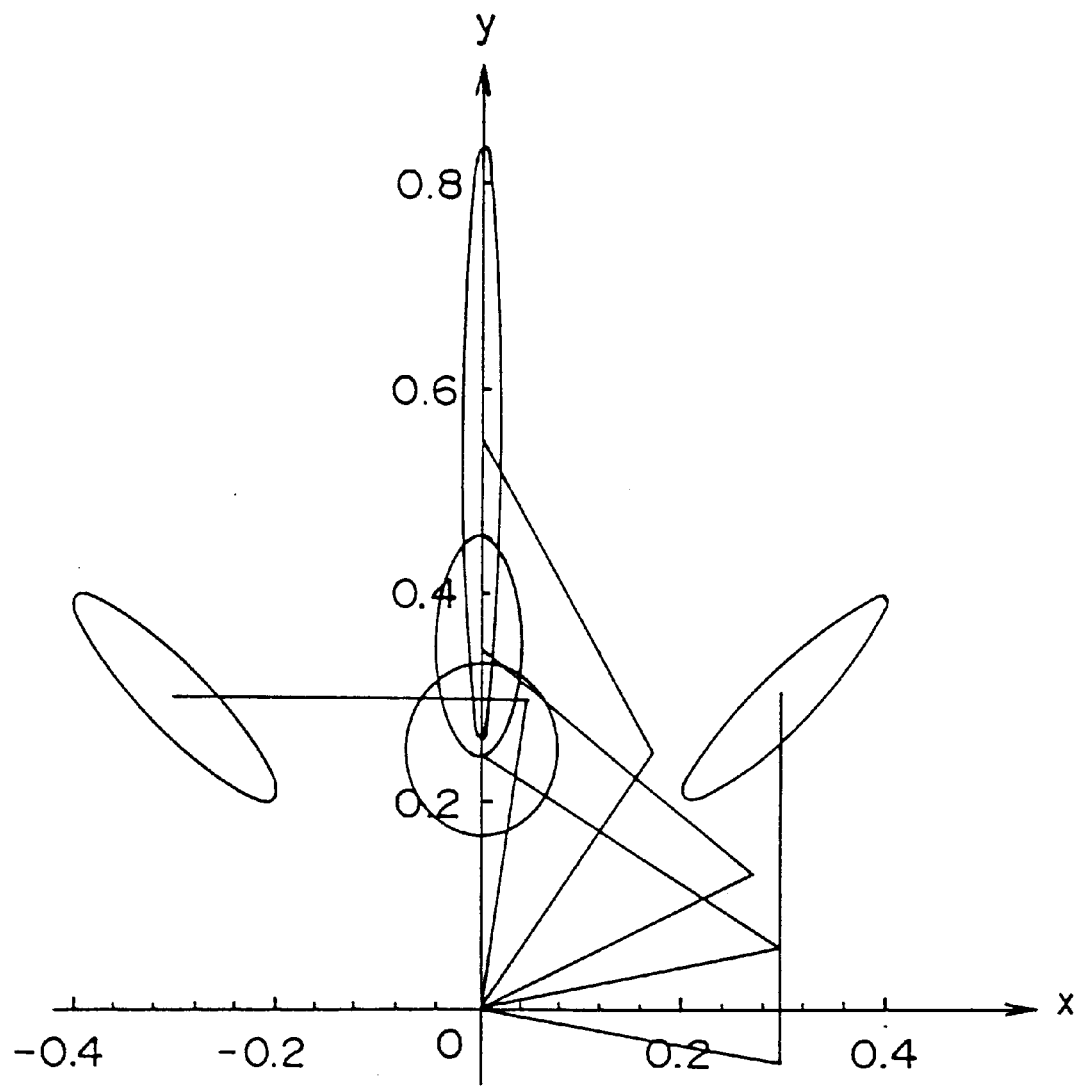
FIG. 7 shows a simulation result of the manipulator control according to the first example.

Referring to FIG. 6 and FIG. 7, the first example will be described.

In the first example, the manipulator is controlled so as to satisfy the specifications 1 and 2. That is, the manipulator is controlled so that the elastic matrix of the hand becomes symmetric (specification 1) and the axis of the elastic ellipsoid of the hand continues pointing to the first joint of the manipulator (specification 2).

According to the specification 1 and equations (4) and (5), the elastic matrices $K_j$, $K_e$, and $K_r$ can be set as symmetric matrices. For satisfying the specification 2, the elastic matrix $K_r$ of the hand must be a diagonal matrix. By specific calculation of the right side of equation (10), the element $K_{r12}$ of the elastic matrix $K_r$ is determined as follows.

$$k_{r12} = \frac{-k_{j12}L_1^2 + (k_{j11} - k_{j12})L_2^2 + L_1 L_2 \cos(q_2)(k_{j11} - 2k_{j12})}{L_1 L_2 r^2 \sin(q_2)} \tag{11}$$

Here, the elastic matrix $K_r$ is symmetric and $K_{r12}=K_{r21}$ according to the specification 1. The "r" in equation (11) means the distance between the first joint and the hand, and obtained by equation (12).

$$r = \sqrt{L_1^2 + L_2^2 + 2L_1 L_2 \cos(q_2)} \tag{12}$$

The element $k_{j12}$ of the elastic matrix $K_j$ is determined as follows, if the element $k_{j12}$ is obtained using the equation (11) under the condition of $K_{r12}=0$.

$$k_{j12} = \frac{k_{j11} L_2 (L_2 + L_1 \cos(q_2))}{L_1^2 + L_2^2 + 2L_1 L_2 \cos(q_2)} \tag{13}$$

Therefore, when the element $k_{j12}$ of the elastic matrix $K_j$ is determined as shown by function (13), the elastic matrix $K_r$ becomes diagonal matrix in the X-Y coordinate system, and a major axis of the corresponding elastic ellipsoid is directed toward the first joint. Here, the values of the element $k_{j11}$ and the element $k_{j22}$ of the elastic matrix $K_j$ must be otherwise designated.

FIG. 6 is a flowchart indicating the control method according to the first example.

When the control method is started, an operator set the lengths of the links of the manipulator 2 (step S21), and further, set the values of the elements $k_{j11}$, and $k_{j22}$ (step S22). Then, the control device 1 calculates the value of the element $k_{j12}$ according to equation (13) (step S23) and decides the values of each of the elements of the elastic matrix $K_j$ of the joint (step S24). In this method, the values of the elements $k_{j11}$ and $k_{j22}$ are decided by values designated by an operator, and the value determined in step S23 is used for the values of the elements $k_{j12}$ and $k_{j21}$. Next, the control device 1 prepares the control signal using the elastic matrix $K_j$ of the joint obtained in step S24 to control the manipulator 2 (step S25). Furthermore, the control device 1 determines whether or not the control method is finished (step S26). If the control method is not finished, the process goes back to step S23.

FIG. 7 shows a simulation result according to the first example. This figure shows five examples of the elastic ellipse of the hand of the manipulator, each of which are at different positions of the hand. In this simulation, the lengths of the links 11 and 12 are set at 0.3 (m) and 0.35 (m), respectively, and the values of the elements $k_{j11}$ and $k_{j22}$ are set at constants of 0.1 and 0.2, respectively. The coordinates of the positions of the five elastic ellipsoids are (0, 0.25), (0, 0.35), (0, 0.55), (0.3, 0.3), and (−0.3, 0.3). This figure indicates that the major axes of all of the elastic ellipsoids of the hand of the manipulator in five different positions are directed to the first joint, and the control satisfies specifications 1 and 2.

In particular, when the lengths $L_1$ and $L_2$ of the links 11 and 12 of the manipulator are the same, function (13) becomes simplified as shown by function (14).

$$k_{j12} = k_{j11}/2 \quad (14)$$

In this case, the elastic matrix $K_r$ is calculated by equation (15) according to equation (10).

$$K_r = \frac{1}{r^2}\begin{bmatrix}(-k_{j11}+4k_{j22})\cot^2(q_2/2) & 0 \\ 0 & k_{j11}\end{bmatrix} \quad (15)$$

$$(\text{if } L_1 = L_2, K_{j11} = 2k_{j12})$$

Therefore, equation (14) may be used instead of equation (13) in the process of step S23 of FIG. 6.

The element $k_{r11}$ of the matrix $K_r$ in equation (15) varies according to the postures and the angles $q_2$ of the manipulator, while the shape of the elastic ellipse of the hand is determined by the ratio of the value of the element $k_{r11}$ to the value of the element $k_{r22}$ of the matrix $K_r$, and the size of the elastic ellipsoid is proportional to the value of the determinant of the matrix $K_r$. Therefore, when the elastic matrix $K_j$ of the joint is set according to equation (14), the shape and the size of the elastic ellipsoid of the hand vary according to the posture of the manipulator.

Figure 8:
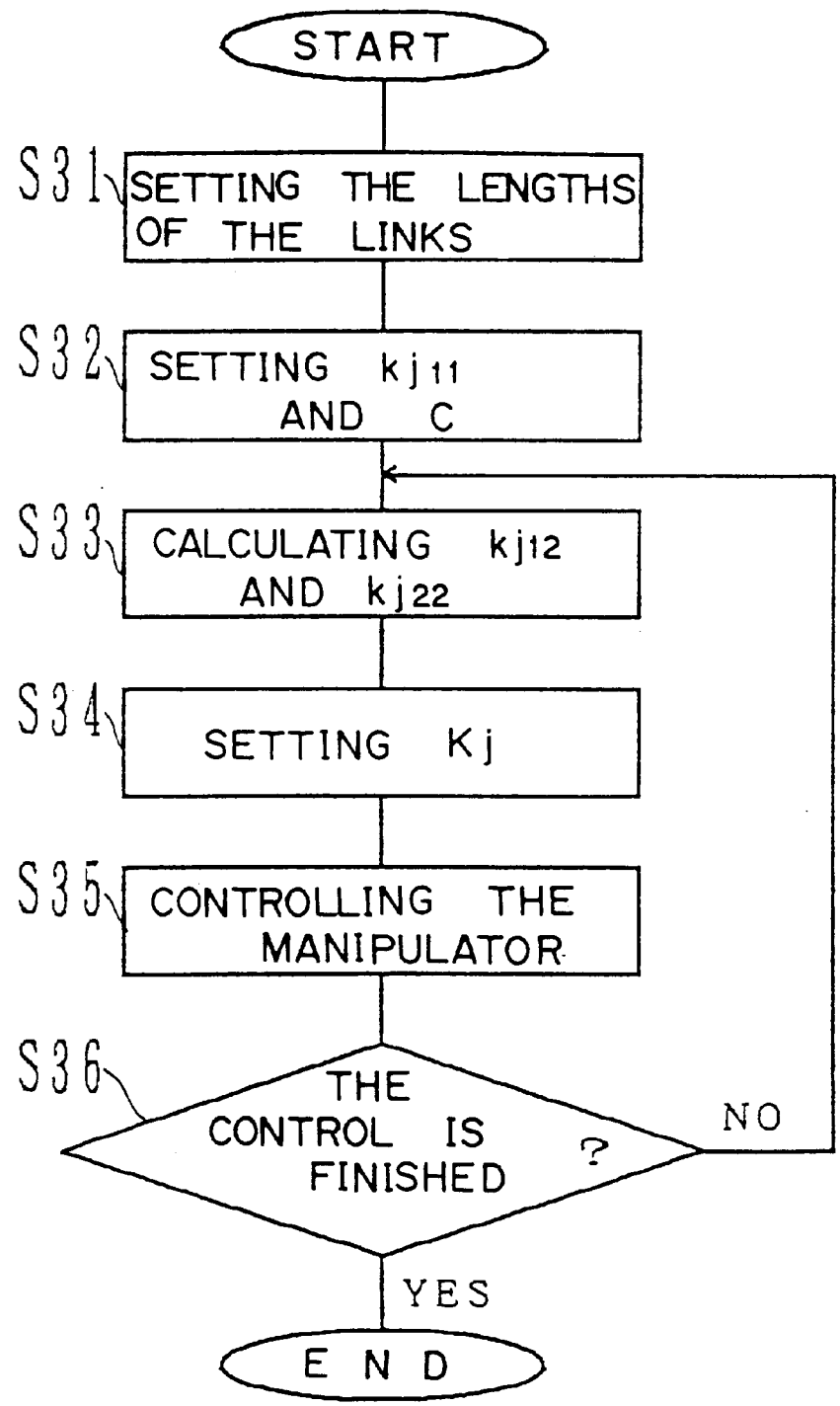
FIG. 8 is a flowchart indicating a method for a manipulator control according to a second example of the present invention.
Figure 9:
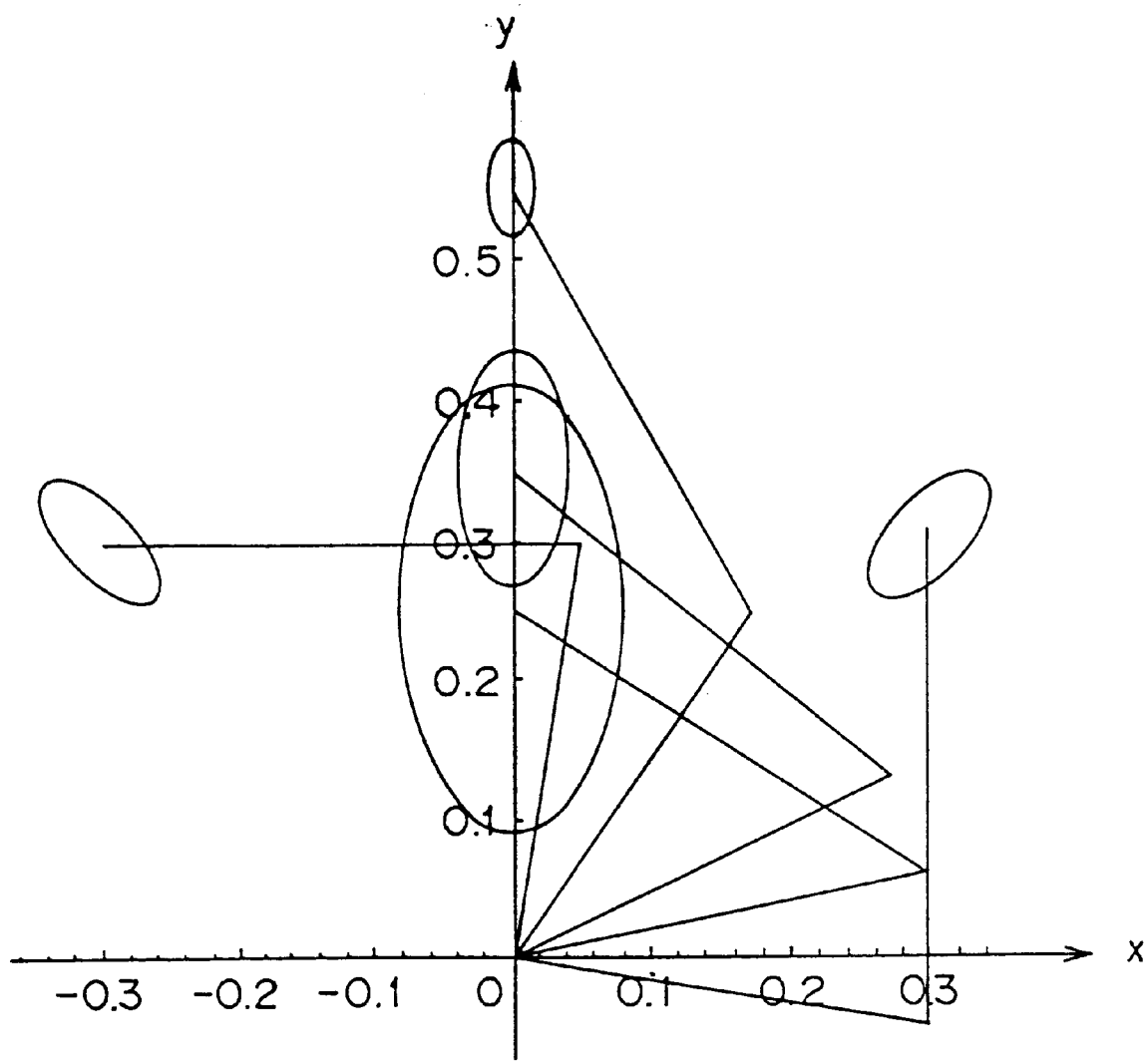
FIG. 9 shows a simulation result of the manipulator control according to the second example.

Referring to FIG. 8 and FIG. 9, the second example will be described.

In the second example, the manipulator is controlled so as to satisfy the specifications 1, 2, and 3. That is, the manipulator is controlled so that the elastic matrix of the hand becomes symmetric (specification 1), a major axis of the elastic ellipsoid of the hand continues pointing to the first joint of the manipulator (specification 2), and the ratio of the major axis to the minor axis of the elastic ellipsoid of the hand of the manipulator becomes a specified value (specification 3).

The value of the element $k_{j12}$ of the elastic matrix $K_j$ of the joint is set according to equation (13) in order to satisfy the specifications 1 and 2. Furthermore, in order to satisfy the specification 3, the ratio of the element $k_{r11}$ to the element $k_{r22}$ of the elastic matrix $K_r$ is set as follows.

$$k_{r11}/k_{r22} = c \quad (16)$$

Here, the "c" represents the ratio of the major axis to the minor axis of the elastic ellipsoid of the hand, and can be set as a constant or a function of the position (x, y) of the hand. The elastic matrix $K_j$ of the joint is designed so as to satisfy equation (16).

Substituting $k_{j12}$ of equation (13) into the right side of equation (10) and using equation (16), the element $k_{j22}$ of the matrix $K_j$ is obtained as follows.

$$k_{j22} = \frac{k_{j11}}{r^4}\{L_2^2(L_1\cos q_2 + L_2)^2 + c(L_1 L_2 \sin q_2)^2\} \quad (17)$$

If the elements $k_{j12}$ and $k_{j22}$ are set according to equations (13) and (17), respectively, the elastic matrix $K_r$ is represented by equation (18) according to equation (10).

$$K_r = \frac{k_{j11}}{r^2}\begin{bmatrix}c & 0 \\ 0 & 1\end{bmatrix} \quad (18)$$

In this way, the matrix $K_j$ which satisfies specifications 1 through 3 is set for the manipulator. The value of the element $k_{j11}$ and the value or the function of c must be set by an operator.

FIG. 8 is a flowchart indicating a method according to the second example.

After the method is started, an operator sets the lengths of the links of the manipulator 2 (step S31), and also set the values of $k_{j11}$ and c (step S32). Then, the control device 1 calculates the values of $k_{j12}$ and $k_{j22}$ according to equations (13) and (17), respectively (step S33), and determines all the values of the elements of the elastic matrix $K_j$ of the joint (step S34). In this step, $k_{j11}$ is determined by the value designated by the operator, and the values calculated in step S33 are used for $k_{j12}$ and $k_{j22}$. The values of $k_{j12}$ and $k_{j21}$ are the same. Next, the control device 1 creates the control signal to control the manipulator 2 using the elastic matrix $K_j$ of the joint (step S35), and determines whether or not the control process is finished (step S36). If the process is not finished, the process returns to step S33.

FIG. 9 shows a simulation result of the manipulator control according to the second example. In this figure, the lengths of the links and the positions of the hand are the same as those used in FIG. 7. The value of the element $k_{j11}$ of the elastic matrix $K_j$ is set to be 0.1, and the ratio c of the major axis to the minor axis of the elastic ellipsoid of the hand is set to be 2. This figure shows that the major axes of all of the elastic ellipsoids of the hand of the manipulator in five different positions are directed to the first joint, the ratios of the major axes to the minor axes of the elastic ellipsoids are the same, and the control satisfies specifications 1 through 3. However, the sizes of the elastic ellipsoids, each of which is proportional to the value of the determinant of the matrix $K_r$, vary depending on the distance r between the first joint and the hand according to equation (18).

In particular, when the length $L_1$ of the link 11 of the manipulator is equal to the length $L_2$ of the link 12, function (17) becomes simplified as shown by function (19).

$$k_{j22} = \frac{k_{j11}}{4}\left\{1 + c\tan^2\left(\frac{q_2}{2}\right)\right\} \quad (19)$$

Here, according to equations (14) and (19), the elastic matrix $K_j$ of the joint is represented by the following equation.

In this case, equation (20) can be used in step S33 in FIG. 8 instead of equations (13) and (17).

$$K_j = K_{j11}\begin{bmatrix}1 & \frac{1}{2} \\ \frac{1}{2} & \frac{1}{4}\{1 + c\tan^2\left(\frac{q_2}{2}\right)\}\end{bmatrix} \quad (20)$$

Figure 10:
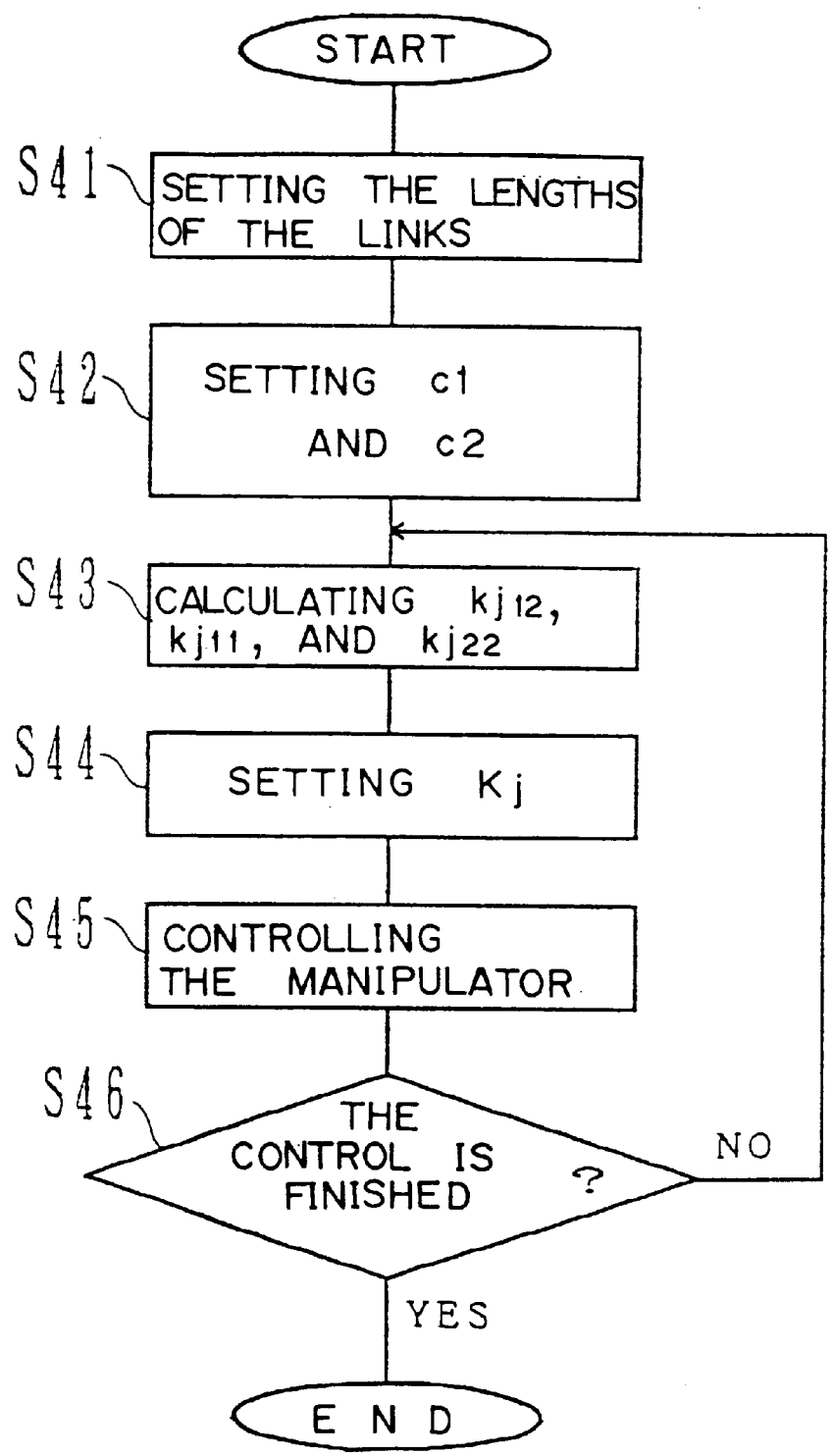
FIG. 10 is a flowchart indicating a method for a manipulator control according to a third example of the present invention.
Figure 11:
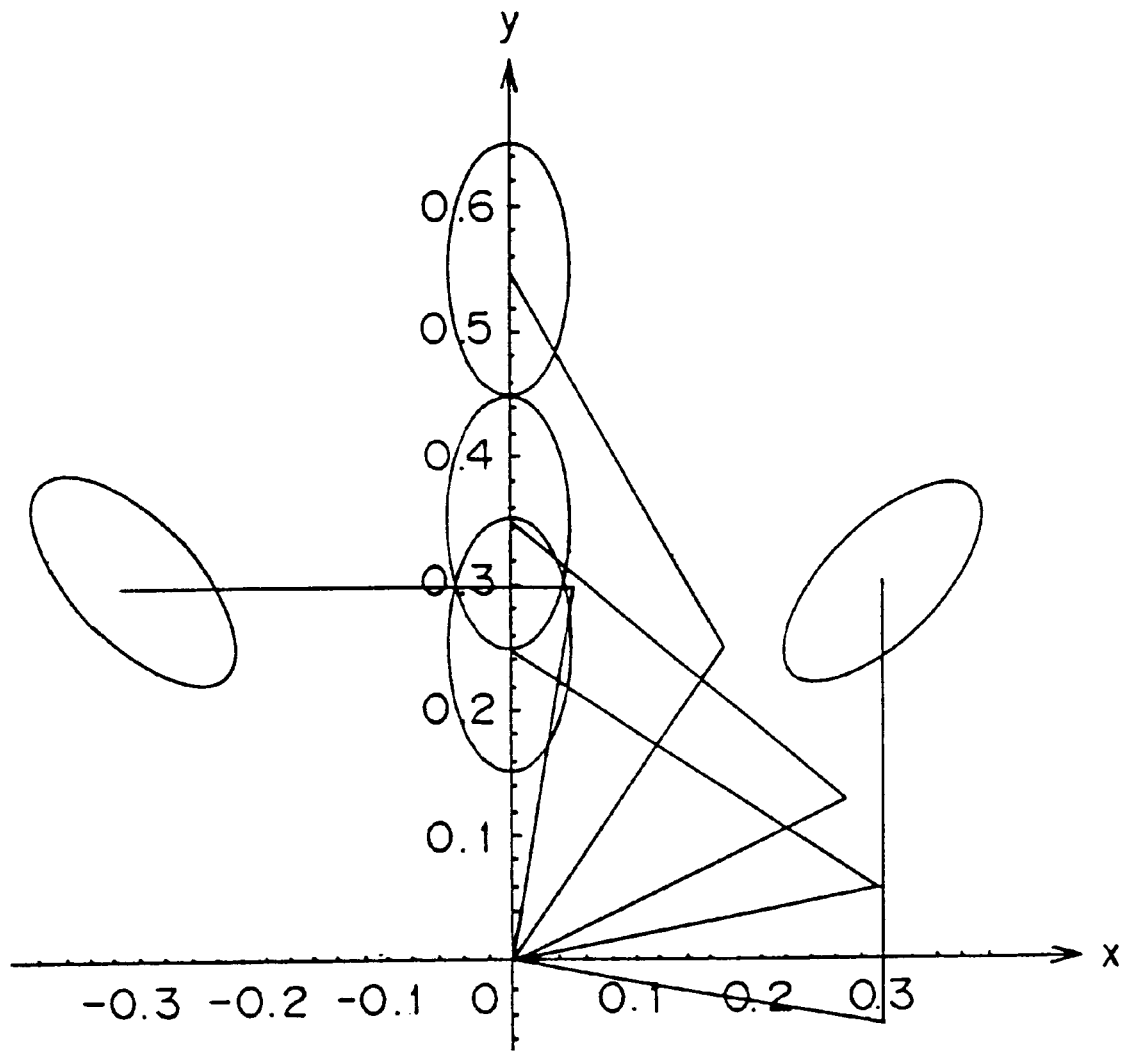
FIG. 11 shows a simulation result of the manipulator control according to the third example.

Referring to FIG. 10 and FIG. 11, the third example will be described.

In the third example, the manipulator is controlled so as to satisfy the specifications 1, 2, and 4. That is, the manipulator is controlled so that the elasticity matrix of the hand becomes symmetric (specification 1), the major axis of the elastic ellipsoid of the hand continues pointing to the first joint of the manipulator (specification 2), and the lengths of the major axis and the minor axis of the elastic ellipsoid of the hand are always set to be respective specified values (specification 4).

The value of the element $k_{j12}$ of the elastic matrix $K_j$ of the joint is set as shown in equation (13) so as to satisfy the conditions of specifications 1 and 2. Further, in order to satisfy the condition of specification 4, the values of the element $k_{r11}$ and the element $k_{r22}$ of the elasticity matrix $K_r$ are set as follows.

$$k_{r11}=c_1, k_{r22}=c_2 \quad (21)$$

Here, "$c_1$" and "$c_2$" are constants (or variables, for example functions of hand) corresponding to the lengths of the major axis and the minor axis of the elastic ellipsoid of the hand, respectively. Because $k_{j12}$ is set according to equation (13), both $k_{r12}$ and $k_{r21}$, are zero ($k_{r12}=k_{r21}=0$).

Substituting $k_{j12}$ in equation (3) into the right side of equation (10), and $c_1$ and $c_2$ in equation (21) into the calculation result of equation (10), the elements $k_{j11}$ and $k_{j22}$ are obtained as follows.

$$k_{j11}=c_2\, r^2 \quad (22)$$

$$k_{j22} = c_1 L_1^2 L_2^2 \sin^2\frac{q_2}{r^2} + c_2 \frac{L_2^2(L_1 \cos q_2 + L_2)^2}{r^2} \quad (23)$$

When the elements of the elastic matrix $K_j$ of the joint are designated according to equations (13), (22), and (23), the elastic matrix $K_r$ of the hand is represented as follows.

$$K_r = \begin{bmatrix} c_1 & 0 \\ 0 & c_2 \end{bmatrix} \quad (24)$$

Therefore, the axis of the elastic ellipsoid of the hand is always directed toward the first joint, and the shape and the size of the elastic ellipsoid are constant.

FIG. 10 is a flowchart indicating a process for a manipulator control according to a third example.

When the process is started, an operator sets the lengths of the links of the manipulator 2 (step 41), and also set the lengths of the major axis $c_1$ and the minor axis $c_2$ (step S42). Then, the control device 1 calculates the values of $k_{j12}$, $k_{j11}$ and $k_{j22}$ according to equations (13), (22), and (23) (step S43), and determines all values of the elements of the elastic matrix $K_j$ of the joint (step S44). In this step, the values calculated in step S43 are used for $k_{j12}$, $k_{j11}$, and $k_{j22}$. The values of $k_{j12}$ and $k_{j21}$ are the same. Next, the control device 1 creates the control signal to control the manipulator 2 using the elastic matrix $K_j$ of the joint (step S45), and determines whether or not the control process is finished (step S46). If the process is not finished, the process returns to step S43.

FIG. 11 shows a simulation result of the manipulator control according to the third example.

In this figure, the lengths of the links and the positions of the hand are the same as those used in FIG. 7. The lengths of the major axis and the minor axis of the elastic ellipsoid of the hand are set to be 2.0 and 1.0, respectively. This figure shows that the major axes of all of the elastic ellipsoids of the hand of the manipulator in five different positions are directed to the first joint, the lengths of all major axes and all minor axes of the elastic ellipsoids are the same, respectively, and the control satisfies specifications 1, 2, and 4.

In particular, when the length $L_1$ of the link 11 of the manipulator is equal to the length $L_2$ of the link 12, functions (13), (22), and (23) are simplified, and the elasticity matrix $K_j$ of joint is represented by the following equation.

$$K_j = L_1^2 \begin{bmatrix} 4c_2 \cdot \cos^2(q_2/2) & 2c_2 \cdot \cos^2(q_2/2) \\ 2c_2 \cdot \cos^2(q_2/2) & c_2 \cdot \cos^2(q_2/2) + c_1 \cdot \sin^2(q_2/2) \end{bmatrix} \quad (25)$$

Therefore, in this case, function (25) can be used in step S43 in FIG. 10 instead of functions (13), (22), and (23).

In the above described example, specific combinations of the specifications of the elastic of the hand are used for setting the elastic matrices of the joint. However, optional combinations of the specifications can be used for setting the elastic matrices. Further, specifications other than specifications 1 through 4 can be also used. Furthermore, although controls for the motions of the two-joint manipulator in a two-dimensional plane are explained in the above examples, these methods can be applied to controls for the motions in three-dimensional space and also applied to the controls of manipulators comprising more than three joints. The elastic matrices of the joint determined according to the invention can be utilized for setting the elastic matrices the feedback-gains in joint-coordinates or an artificial muscle control manipulator.

The artificial muscle control manipulator comprises a joint-control portion constituted by artificial muscles using, for example, a pneumatic rubber muscle actuators. The pneumatic rubber muscle actuators having variable elasticity are located around the joint, and the difference in the torque between the opposed pneumatic rubbers is the effective torque of the joint. The elasticity of the joint of the manipulator is adjusted by simultaneously working the opposed pneumatic rubber muscle actuators. The artificial muscle control manipulator is expected to be applied to an operation in which the manipulator directly makes contact with the objects or the human body, because the position of the hand and the elasticity around the joint are controlled simultaneously and independently.

Up to now, an effective method for setting the elasticity of a hand of an artificial muscle control manipulator has not been realized. According to the invention, however, the elasticity of the hand of the artificial muscle control manipulator can be set so as to possess the similar elasticity to that of the human hand.

The elastic matrix of a hand according to the invention can be also utilized to the feedback-gain in a coordinate of the joint. For example, regulation of the feedback of the manipulator as shown by equation (26) can be employed.

$$\hat{v} = -K_P(\hat{q}-\hat{q}^d) - K_D \dot{\hat{q}} \quad (26)$$

Here, $\hat{v}$ and $\hat{q}^d$ are vectors representing a control input of the joint to the manipulator, and a target value of the coordinate of joint q hat, respectively. $K_P$ and $K_D$ are matrices representing the feedback-gain, and the coefficient of a term corresponding to the change of time of the coordinate of joint q hat, respectively. Applying the elastic matrix of the joint according to the invention to the setting of the feedback-gain $K_P$, the elasticity of the hand of the manipulator can be set to satisfy the above described specifications.

In the description of the embodiment of this invention, the method for setting the elasticity is explained. However, the method for setting the flexibility of the manipulator according to the invention is not limited to the method for setting the elasticity. For example, the viscosity, which is also an element for deciding the flexibility of the manipulator, can be used for realizing the characteristics similar to the human hand, by utilizing an appropriate rule for control.

According to the invention, since the flexibility of the manipulator can be set so as to possess characteristics similar to those of the human hand, automatic control of the manipulator applicable to many kinds of complicated operations can be realized.

What is claimed is:

1. A method for setting flexibility of a manipulator, comprising the steps of:
   extracting characteristics used for setting flexibility of a hand of the manipulator from a measurement result of flexibility of a human hand;
   deciding a specific specification for the flexibility of the hand of the manipulator based on the characteristics extracted from the measurement result of flexibility of the human hand;
   transforming the specification of the flexibility of the hand of the manipulator into a specification of flexibility of a joint of the manipulator; and
   setting the flexibility of the joint of the manipulator, wherein one of characteristics that a matrix indicating elasticity of the hand of the manipulator is a symmetric matrix, that an axis of an elastic ellipsoid representing the hand of the manipulator is directed toward a joint of the manipulator, that a ratio of the major axis to the minor axis of the elastic ellipsoid becomes a designated value, and that lengths of the major axis and the minor axis of the elastic ellipsoid become specified values, is used as the specification of the flexibility of the joint of the manipulator.

2. The method according to claim 1, wherein
   one of elasticity and viscosity is used as the flexibility of the joint of the manipulator.

3. The method according to claim 1, further comprising the steps of:
   setting a condition for determining the elements of a first matrix indicating elasticity of the hand of the manipulator;
   expressing the elements of the first matrix by elements of a second matrix indicating elasticity of the joint of the manipulator; and
   determining an equation for calculating the elements of the second matrix using the condition.

4. A method for controlling a manipulator, comprising the steps of:
   extracting characteristics used for setting flexibility of a hand of the manipulator from a measurement result of flexibility of a human hand;
   deciding a specific specification for the flexibility of the hand of the manipulator based on the characteristics extracted from the measurement result of flexibility of a human hand;
   transforming the specifications of the flexibility of the hand of the manipulator into a specification of flexibility of a joint of the manipulator;
   setting the flexibility of the joint of the manipulator; and
   driving the manipulator according to the flexibility of the joint of the manipulator, wherein one of characteristics that a matrix indicating elasticity of the hand of the manipulator is a symmetric matrix, that an axis of an elastic ellipsoid representing the hand of the manipulator is directed toward a joint of the manipulator, that a ratio of the major axis to the minor axis of the elastic ellipsoid becomes a designated value, and that lengths of the major axis and the minor axis of the elastic ellipsoid become specified values, is used as the specification of the flexibility of the joint of the manipulator.

5. The method according to claim 3, wherein the first matrix is a symmetric matrix.

6. A manipulator control device used in a system for controlling motions of a manipulator by providing control signals corresponding to the states of a joint of the manipulator to the manipulator while monitoring the movements of the joint, comprising:
   input means for receiving a parameter which defines flexibility of the manipulator;
   processing means for determining a value of the control signal using the parameter and a flexibility of a joint of the manipulator obtained according to a characteristic extracted from a measurement result of the flexibility of a human hand; and
   output means for outputting the control signal to the manipulator, wherein one of characteristics that a matrix indicating elasticity of the hand of the manipulator is a symmetric matrix, that an axis of an elastic ellipsoid representing the hand of the manipulator is directed toward a joint of the manipulator, that a ratio of the major axis to the minor axis of the elastic ellipsoid becomes a designated value, and that lengths of the major axis and the minor axis of the elastic ellipsoid become specified values, is used as the specification of the flexibility of the joint of the manipulator.

7. The manipulator control device according to claim 6, wherein
   the input means receive a specific value for determining an element of one of a first matrix indicating elasticity of a hand of the manipulator and a second matrix indicating elasticity of the joint of the manipulator, as the parameter; and
   the processing means determines the second matrix which indicates the flexibility of the joint of the manipulator using the specific value and an angle of the joint of the manipulator, and determines the value of the control signal using the second matrix.

8. The manipulator control device according to claim 6, wherein
   the processing means calculate a feedback-gain obtained according to a feedback control of the manipulator, and determine a new control signal according to the feedback-gain; and
   the output means output the new control signal to the manipulator.

9. A manipulator control device used in a system for controlling a manipulator which comprises a first link connected to a first joint and a second link connected to a hand of the manipulator and connected to the first link through a second joint while monitoring a motion of the manipulator, comprising:
   input means for receiving elasticity parameter which prescribes elastic characteristics of the manipulator;
   processing means for determining a value of the control signal corresponding to a state of a joint of the manipulator using the elasticity parameter and the elastic characteristics of the joint obtained according to a characteristic extracted from a measurement result of the flexibility of a human hand; and
   output means for outputting the control signal to the manipulator, wherein
   the input means receive a specific value used for determining elements of a first matrix indicating elasticity of the joint as the elasticity parameter;
   the processing means determine the first matrix so that a second matrix indicating elasticity of the hand of the manipulator becomes a symmetric matrix and an axis of an elastic ellipsoid representing the hand is directed toward the first joint, and determine the value of the control signal using the first matrix.

10. The manipulator control device according to claim 9, wherein
the processing means determine the first matrix using angles of the second joint.

11. A manipulator control device used in a system for controlling a manipulator which comprises a first link connected to a first joint and a second link connected to a hand of the manipulator and connected to the first link through a second joint while monitoring a motion of the manipulator, comprising:
input means for receiving elasticity parameter which prescribes elastic characteristics of the manipulator;
processing means for determining a value of the control signal corresponding to a state of a joint of the manipulator using the elasticity parameter and the elastic characteristics of the joint obtained according to a characteristic extracted from a measurement result of the flexibility of a human hand; and
output means for outputting the control signal to the manipulator, wherein
the input means receive a first specific value used for determining diagonal elements of a first matrix indicating elasticity of the joint and a function used for deciding a ratio of the major axis to the minor axis of a elastic ellipsoid representing the hand, as the elastic parameter,
the processing mens determine the first matrix so that a second matrix indicating elasticity of the hand becomes a symmetric matrix and an axis of the elastic ellipsoid is directed toward the first joint, using the first specific value and an angle of the second joint, and determine the control signal using the first matrix.

12. The manipulator control device according to claim 11, wherein
the input means receive a second specific value determining the ratio of the major axis to the minor axis of the elastic ellipsoid as the function.

13. A manipulator control device used in a system for controlling a manipulator which comprises a first link connected to a first joint and a second link connected to a hand of the manipulator and connected to the first link through a second joint while monitoring a motion of the manipulator, comprising:
input means for receiving elasticity parameter which prescribes elastic characteristics of the manipulator;
processing means for determining a value of the control signal corresponding to a state of a joint of the manipulator using the elasticity parameter and the elastic characteristics of the joint obtained according to a characteristic extracted from a measurement result of the flexibility of a human hand; and
output means for outputting the control signal to the manipulator, wherein
the input means receive a first specific value used for determining the diagonal elements of the a first matrix indicating elasticity of the joint, a second specific value used for determining the length of the major axis of a elastic ellipsoid representing the hand, and the third specific value used for deciding a length of the minor axis of the elastic ellipsoid, as the elasticity parameter;
the processing means determine the first matrix so that a second matrix indicating elasticity of the hand becomes a symmetric matrix and an axis of the elastic ellipsoid is directed toward the first joint, using the first specific value, the second specific value, the third specific value, and an angle of the second joint, and determine the control signal using the first matrix.

14. A method for setting flexibility of a manipulator, comprising the steps of:
setting a condition for determining elements of a first matrix indicating elasticity of a hand of the manipulator;
expressing the elements of the first matrix by elements of a second matrix indicating elasticity of a joint of the manipulator; and
determining an equation for calculating the elements of the second matrix using the condition, wherein one of characteristics that a matrix indicating elasticity of the hand of the manipulator is a symmetric matrix, that an axis of an elastic ellipsoid representing the hand of the manipulator is directed toward a joint of the manipulator, that a ratio of the major axis to the minor axis of the elastic ellipsoid becomes a designated value, and that lengths of the major axis and the minor axis of the elastic ellipsoid become specified values, is used as the specification of the flexibility of the joint of the manipulator.

15. A method for setting flexibility of a manipulator which comprises a first link connected to a first joint and a second link connected to a hand of the manipulator and connected to the first link through a second joint, including the steps of:
expressing the elements of a first matrix indicating elasticity of the hand by elements of a second matrix indicating elasticity of a joint of the manipulator;
setting conditions that the first matrix is a symmetric matrix, that an axis of an elastic ellipsoid representing the hand is directed toward the first joint, and that a ratio of the major axis to the minor axis of the elastic ellipsoid becomes a designated value;
determining an equation for calculating the elements of the second matrix using the conditions; and
setting the flexibility of the manipulator according to the second matrix.

16. The method according to claim 15, wherein
the first link is set to have the same length as that of the second link.

17. A method for setting flexibility of a manipulator which comprises a first link connected to a first joint and a second link connected to a hand of the manipulator and connected to the first link through a second joint, including the steps of:
expressing the elements of a first matrix indicating elasticity of the hand by elements of a second matrix indicating elasticity of a joint of the manipulator;
setting conditions that the first matrix is a symmetric matrix, that an axis of an elastic ellipsoid representing the hand is directed toward the first joint, and that lengths of the major axis and the minor axis of the elastic ellipsoid become specified values;
determining an equation for calculating the elements of the second matrix using the conditions; and
setting the flexibility of the manipulator according to the second matrix.

18. The method according to claim 17, wherein
the first link is set to have the same length as that of the second link.

19. A method for controlling a manipulator which comprises a first link connected to a first joint and a second link connected to a hand of the manipulator and connected to the first link through a second joint, including the steps of:

expressing the elements of a first matrix indicating elasticity of the hand by elements of a second matrix indicating elasticity of a joint of the manipulator;

setting conditions that the first matrix is a symmetric matrix, that an axis of an elastic ellipsoid representing the hand is directed toward the first joint, and that a ratio of the major axis to the minor axis of the elastic ellipsoid becomes a designated value;

determining an equation for calculating the elements of the second matrix using the conditions;

setting the flexibility of the manipulator according to the second matrix; and driving the manipulator using the second matrix.

20. A method for controlling a manipulator which comprises a first link connected to a first joint and a second link connected to a hand of the manipulator and connected to the first link through a second joint, including the steps of:

expressing the elements of a first matrix indicating elasticity of the hand by elements of a second matrix indicating elasticity of a joint of the manipulator;

setting conditions that the first matrix is a symmetric matrix, that an axis of an elastic ellipsoid representing the hand is directed toward the first joint, and that lengths of the major axis and the minor axis of the elastic ellipsoid become specified values;

determining an equation for calculating the elements of the second matrix using the conditions;

setting the flexibility of the manipulator according to the second matrix; and driving the manipulator using the second matrix.

21. A method for setting flexibility of a manipulator which comprises a first link connected to a first joint and a second link connected to a hand of the manipulator and connected to the first link through a second joint, including the steps of:

expressing the elements of a first matrix indicating elasticity of the hand by elements of a second matrix indicating elasticity of a joint of the manipulator;

using as a specification of flexibility of the joint of the manipulator characteristics of one of the first matrix indicating elasticity of the hand of the manipulator being a symmetric matrix, an axis of an elastic ellipsoid representing the hand of the manipulator being directed toward the joint of the manipulator, a ratio of the major axis to the minor axis of the elastic ellipsoid becomes a designated value, and lengths of the major axis and the minor axis of the elastic ellipsoid becoming specified values;

determining an equation for calculating the elements of the second matrix using the characteristics; and setting the flexibility of the manipulator according to the second matrix.

22. A method for controlling a manipulator which comprises a first link connected to a first joint and a second link connected to a hand of the manipulator and connected to the first link through a second joint, including the steps of:

expressing the elements of a first matrix indicating elasticity of the hand by elements of a second matrix indicating elasticity of a joint of the manipulator;

using as a specification of flexibility of the joint of the manipulator characteristics of one of the first matrix indicating elasticity of the hand of the manipulator being a symmetric matrix, an axis of an elastic ellipsoid representing the hand of the manipulator being directed toward the joint of the manipulator, a ratio of the major axis to the minor axis of the elastic ellipsoid becomes a designated value, and lengths of the major axis and the minor axis of the elastic ellipsoid becoming specified values;

determining an equation for calculating the elements of the second matrix using the characteristics;

setting the flexibility of the manipulator according to the second matrix; and driving the manipulator using the second matrix.

* * * * *